(12) United States Patent
Janke et al.

(10) Patent No.: US 7,546,765 B1
(45) Date of Patent: Jun. 16, 2009

(54) SCANNING DEVICE AND METHOD FOR ANALYZING A ROAD SURFACE

(75) Inventors: Richard D. Janke, Holly, MI (US); Mine Tasci, Walled Lake, MI (US); John D. Davis, Milford, MI (US); James C. Tebbe, Rochester Hills, MI (US); Herbert R. Butterfield, Fenton, MI (US); Timothy D. Roberts, Fenton, MI (US); David A. Ruiz, Plymouth, MI (US); Kyle M. Smith, Royal Oak, MI (US); Donald E. Martini, Howell, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/051,913

(22) Filed: Mar. 20, 2008

(51) Int. Cl.
*G01M 17/02* (2006.01)

(52) U.S. Cl. .......................... 73/146; 340/436; 180/169

(58) Field of Classification Search .................. 73/146; 340/436; 180/169
See application file for complete search history.

(56) References Cited

U.S. PATENT DOCUMENTS

| | | | |
|---|---|---|---|
| 4,868,720 A * | 9/1989 | Miyauchi et al. ............ 362/466 |
| 5,982,278 A * | 11/1999 | Cuvelier ...................... 340/436 |
| 6,452,684 B1 * | 9/2002 | Mennink ...................... 356/601 |
| 6,896,082 B2 * | 5/2005 | Asanuma et al. ............ 180/169 |
| 6,922,636 B2 * | 7/2005 | Balasubramanian et al. ... 702/2 |
| 7,197,425 B2 * | 3/2007 | Masuyama et al. .......... 702/158 |
| 2002/0189875 A1 * | 12/2002 | Asanuma et al. ............ 180/169 |
| 2003/0080192 A1 * | 5/2003 | Tsikos et al. ........... 235/462.14 |
| 2003/0094495 A1 * | 5/2003 | Knowles et al. ......... 235/462.14 |
| 2003/0171872 A1 * | 9/2003 | Balasubramanian et al. 701/223 |
| 2005/0288891 A1 * | 12/2005 | Masuyama et al. .......... 702/167 |

* cited by examiner

*Primary Examiner*—Andre J Allen
(74) *Attorney, Agent, or Firm*—Lionel D. Anderson; Reising Ethington P.C.

(57) ABSTRACT

A road surface scanning device and method for scanning a section of road in order to acquire road surface data, which in turn can be used to create a mathematical model of the road. In one embodiment, the road surface scanning device includes a frame, a carriage movably mounted to the frame, a scanner movably mounted to the carriage, and a pair of electric actuators that can move the scanner across the road surface. Information from adjacent scanner passes are electronically stitched together and, in a similar manner, information from adjacent surface segments are electronically joined to form a mathematical model of the road. Various techniques can then be used to process the road surface data and prepare it for use by other software applications.

19 Claims, 2 Drawing Sheets

SCANNING DEVICE AND METHOD FOR ANALYZING A ROAD SURFACE

TECHNICAL FIELD

The present invention generally relates to scanning devices and, more particularly, to scanning devices that can analyze a road surface by acquiring road surface data that can be used for a variety of purposes.

BACKGROUND

In an effort to reduce costs and to expedite the amount of time it takes to test a product, certain industries are transitioning some or all of their testing processes from actual tests to simulated tests. One such industry is the automotive industry, where there has been some encouragement to move from on-road vehicle testing to off-road computer-based simulation.

SUMMARY OF THE INVENTION

According to one embodiment, there is provided a road surface scanning device that generally comprises a frame, a carriage, a scanner, a first actuator, and a second actuator. The frame has a plurality of structural members including a longitudinal support that extends in a longitudinal direction, and a lateral support that extends in a lateral direction and is securely connected to the longitudinal support. The carriage is movably attached to the frame so that it can move in the longitudinal direction. The scanner has a laser head that emits an incident laser line towards the road surface, and a camera that receives a reflected laser line from the road surface. The first actuator can move the scanner along the carriage in the lateral direction of the scanning device, and the second actuator can move the carriage along the frame in the longitudinal direction of the scanning device.

According to another embodiment, there is provided a method for scanning a road surface. The method generally comprises the steps of: (a) providing a road surface scanning device having at least a scanner, a first actuator, and a second actuator; (b) moving the scanner to a home position; (c) performing a first scanning pass across a first surface strip, wherein the first scanning pass involves moving the scanner with the first actuator while recording road surface data with the scanner; (d) advancing the scanner with the second actuator so that it is positioned over a second surface strip; and (e) performing a second scanning pass across the second surface strip, wherein the second scanning pass involves moving the scanner with the first actuator while recording road surface data with the scanner.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The road surface scanning device and method described herein can scan a road surface in order to acquire road surface data, which in turn can be used to create a mathematical model of the road. The mathematical model, which is a three-dimensional representation of the scanned section of road surface, can be utilized by a variety of different software applications, including vehicle testing applications that analyze and predict factors such as road load, durability, ride, handling, noise, and vibration, to name but a few. It is also possible to use the mathematical model in the construction, validation, monitoring, correlation, etc. of test tracks or other sections of test facilities. Although the following description is directed to a vehicle test track, it should be appreciated that road surface data could be acquired from one of a number of different surfaces, including normal roads, driveways, highways, parking lots, test surfaces, etc. and is not specifically limited to vehicle test tracks.

Figure 1:
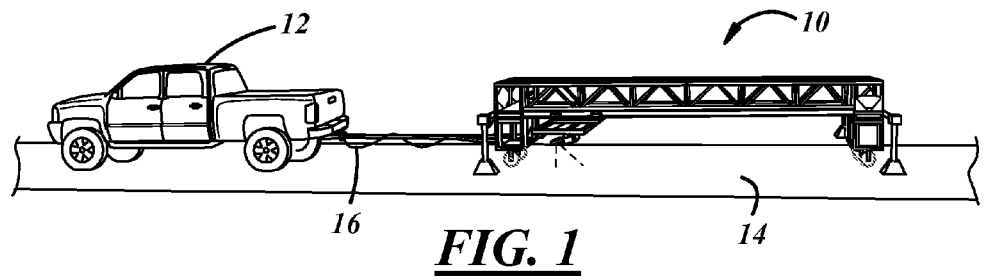
FIG. 1 is a perspective view of an exemplary road surface scanning device being pulled behind a tow vehicle so that it can analyze a road surface.
Figure 2:
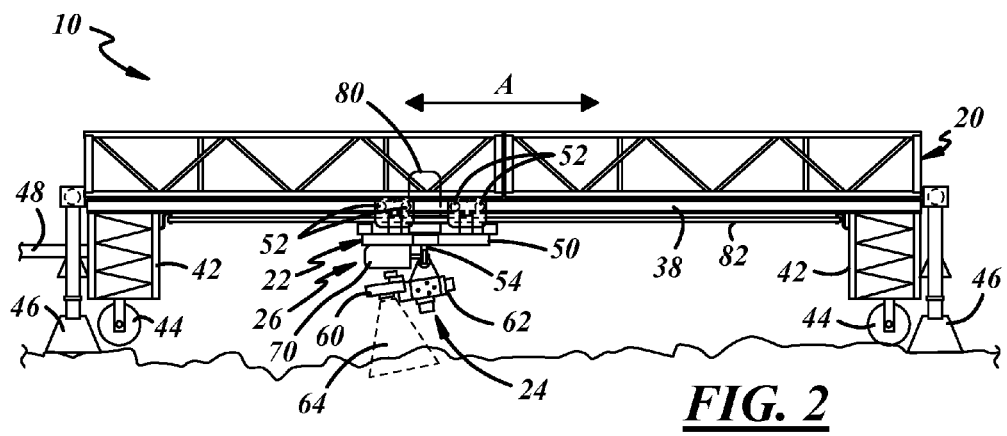
FIG. 2 is an enlarged side view of the exemplary road surface scanning device from FIG. 1.
Figure 3:
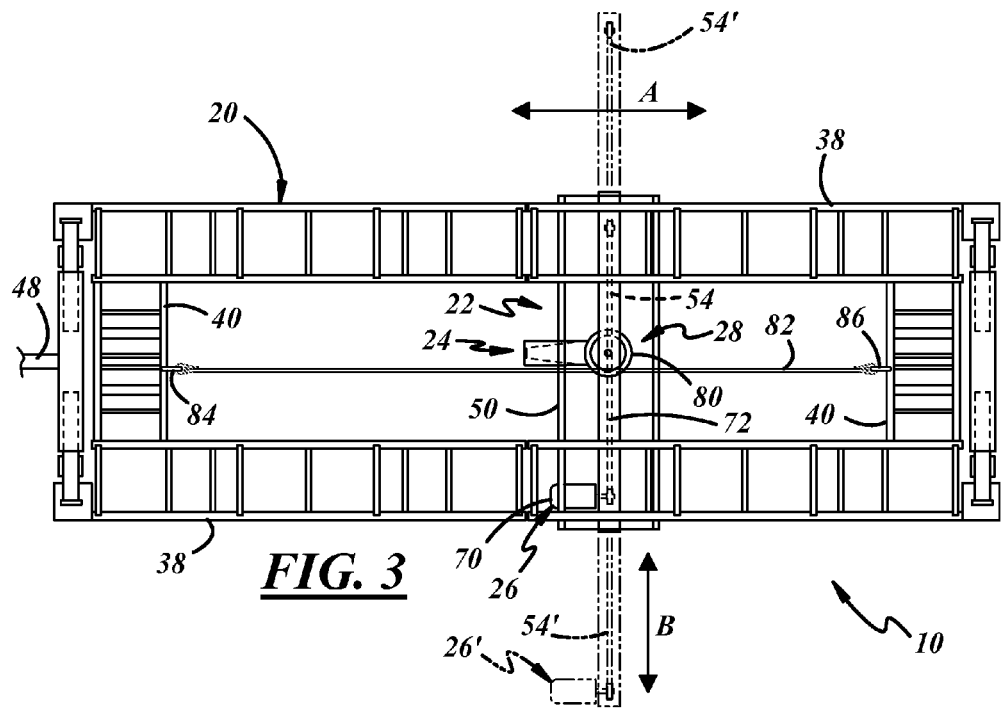
FIG. 3 is an enlarged plan view of the exemplary road surface scanning device from FIG. 1.

With reference to FIGS. 1-3, there is shown an embodiment of a road surface scanning device 10 that is pulled behind a vehicle 12 and acquires various pieces of road surface data from a vehicle test track 14. According to this particular embodiment, road surface scanning device 10 receives electrical power through a power cable 16 that is connected to a power outlet on the back of vehicle 12; not unlike those used to power the lights on a trailer, etc. It is possible, however, for road surface scanning device 10 to use an onboard power source, such as a deep cycle battery, that can power the scanning device for several hours without being hooked up to external power. Road surface scanning device 10 generally includes a frame 20, a carriage 22, a scanner 24, an actuator 26 for moving the scanner along the carriage, and an actuator 28 for moving the carriage along the frame.

Frame 20 is a structural assembly that supports the components of road surface scanning device 10 and can include a number of structural members, such as longitudinal supports 38, lateral supports 40, vertical supports 42, frame wheels 44, stabilizers 46, and a towing hitch 48. Although various types of materials may be used for frame 20, it is preferable that the frame be constructed of a lightweight yet strong metal, such as aluminum or an aluminum alloy.

Longitudinal supports 38 extend in a longitudinal direction of the road surface scanning device 10 (shown in the drawings as direction A) and can provide torsional and other types of strength to frame 20. According to one embodiment, longitudinal supports 38 include elongated channels for receiving carriage wheels that roll within the channels when the carriage moves along the frame, as will be subsequently explained. Lateral supports 40 are generally arranged perpendicularly to longitudinal supports 38 and thus extend in a lateral direction of the road surface scanning device 10 (shown in the drawings as direction B). The lateral supports are securely connected to the longitudinal supports by welds, bolts, or other suitable means and help stabilize frame 20 so that accurate road surface measurements can be taken. Vertical supports 42 extend downward from either the longitudinal supports 38 or the lateral supports 40, and act as legs that can receive any combination of wheels, stabilizes, etc. It should be appreciated that while the exemplary embodiment shown in the drawings has two longitudinal supports 38, two lateral supports 40, and four vertical supports 42, frames with different numbers of structural members and different configurations could also be used.

Frame wheels 44 enable road surface scanning device 10 to be pulled by tow vehicle 12 around vehicle test track 14 so that the position of the scanning device can easily be manipulated. The term 'wheels' broadly includes all types of rolling components, including traditional wheels and casters. Frame wheels 44 are shown mounted to the bottom of each of the vertical supports 42, but could instead be mounted on the sides of the vertical supports or in some other configuration.

Stabilizers 46 act as outriggers of sorts, and are designed to extend downwards from frame 20 and contact the road surface so that road surface scanning device 10 can be maintained in a still and stable position while scanner 24 is acquiring road surface data. The stabilizers could be attached to the vertical supports 42 or to any other suitable component of the frame, and are retractable so that road surface scanning device 10 can be moved from location to location.

Towing hitch 48 is a structural arm that is attached to frame 20 and provides the road surface scanning device 10 with means for being pulled by a tow vehicle 12. In one example, towing hitch 48 includes a conventional socket-type connection with a locking tongue at its end that can slip over top of a ball-type trailer hitch on the back of tow vehicle 12. Other configurations are known in the art and could be used as well.

Carriage 22 is a frame-like structure that supports scanner 24 and is movably attached to frame 20 so that it can travel along the frame in the longitudinal direction A. In this particular embodiment, carriage 22 hangs below longitudinal supports 38 and includes a framework 50, carriage wheels 52, and a track 54.

Framework 50 includes one or more structural members and extends between longitudinal supports 38 of the frame in a generally transverse manner; i.e., the carriage generally extends in a lateral direction B that is perpendicular to the longitudinal direction A of supports 38. The framework should be strong enough to carry scanner 24, as well as other equipment if needed, but light enough to move up and down the length of the frame without great effort. As with frame 20, aluminum or an aluminum alloy could be used to construct framework 50.

Carriage wheels 52 are rotatably attached near the top of carriage 22 and are designed to roll within the elongated channels formed at the bottom of longitudinal supports 38 so that the entire carriage can move or index in the longitudinal direction A; either forward or backward. A suitable number of carriage wheels should be used to ensure smooth movement of the carriage when driven by actuator 28. The exemplary embodiment shown here utilizes a total of sixteen carriage wheels 52; four wheels on each side of the two elongated channels (FIG. 2 only shows four carriage wheels 52 on the outside of one of the elongated channels).

Track 54 is attached near the bottom or underside of framework 50 and generally extends in a parallel manner to the framework in order to provide scanner 24 with means for moving in the lateral direction B. This lateral or side-to-side movement is used during a lateral scan process, as will be explained. In one embodiment, track 54 is the same length as framework 50; thus, scanner 24 has a lateral scan path that is approximately the same width as frame 20. According to another embodiment, track 54' has lateral extensions that protrude from the ends of carriage 22 and effectively increase the extent of the lateral scan so that it is greater than the width of frame 20. This enables scanner 24 to sweep across a wider lateral scan path and is represented in the drawing in phantom. Track 54 does not need to be immovably attached to carriage 22, as it could be pivotally attached to the carriage to allow for rotation. This pivotal attachment could even enable track 54 to be rotated 90° so the track is oriented in the longitudinal direction A, which in turn makes road surface scanning device more flexible in that it can scan in multiple directions. Of course, it is also possible for track 54 to be integrated into framework 50 so that it is an integral part of the framework, instead of being a separate component, as shown here.

Scanner 24 is movably mounted on carriage 22 so that it can pan across sections of the road surface and acquire road surface data therefrom. In this particular embodiment, scanner 24 illuminates the road surface with a laser head 60 and captures reflections from the road surface with a camera 62. It should be appreciated, however, that different types of scanners could be used, including those utilizing lidar, white light, ultrasound, x-ray, multiple laser heads, multiple cameras, etc. A cover, tarp, shield, or the like could be placed around or draped over scanner 24. This can protect the scanner from environmental factors, including those that could damage the scanner, as well as those that could affect the accuracy of the scanner readings. In one example, a box-shaped cloth enclosure is placed around the entire carriage and extends to the ground so that the space above the road surface being scanned is isolated from outside influences. This cloth enclosure can be raised during movement of carriage 22 to provide unrestricted carriage motion.

Laser head 60 preferably emits a laser which strikes the road surface as an incident line or stripe 64; this is in contrast to a laser head that emits a laser that strikes the road as a point. The incident laser line 64 shown here is generally aligned in the longitudinal direction A, so that as scanner 24 pans moves across the carriage in the lateral direction B a road surface area is scanned. It is possible to orient the incident laser line so that it extends in the lateral direction B, however, corresponding changes would need to be made to the way in which the scanner and carriage move during scanning operations. Depending on the distance between laser head 60 and the road surface, as well as the road surface topology, the reflected laser line appears at different places in the field of view of camera 62 and can be used to construct an electronic model of the scanned road surface. This technique is sometimes referred to as triangulation and is understood by those skilled in the art. One example of a suitable scanner 24 is the Shape-Grabber SG1002, which includes a laser and camera integrated into a single unit.

Lateral actuator 26 is mounted to road surface scanning device 10 so that it can move scanner 24 across the width of the scanning device; i.e., in the lateral direction B. In the example shown here, lateral actuator 26 includes a stationary electric motor 70 that is securely mounted to a distal end of track 54 and drives a belt or chain drive 72 coupled to scanner 24. In the embodiment where lateral extensions are added to track 54, a lateral actuator 26' can be mounted out on a distal end of one of the extensions.

Motor 70 can be a stepper motor, which is a brushless electric motor whose position can typically be controlled with precision and without the use of a feedback mechanism; although, both open- and closed-loop feedback mechanisms can be used. When stationary motor 70 drives the belt or chain drive 72 in a first lateral direction, scanner 24 moves along track 54 in a first direction; and when the belt or chain drive is driven in a second direction, the scanner moves back across the track in a second, opposite lateral direction. It should be appreciated that a variety of different motor embodiments could be used. For instance, lateral actuator 26 could include other suitable types of electric motors (i.e., it is not limited to the exemplary stepper motor mentioned above), it could include multiple motors (e.g., a separate electric motor at each end of track 54), it could include electric motors positioned in a location other than the distal end of track 54 (e.g., a motor located more in the middle of the carriage), it could move the scanner with means other than a belt or chain drive, or the motor could move and the belt drive remains stationary (this embodiment is utilized by exemplary longitudinal actuator 28), to name but a few possibilities.

Longitudinal actuator 28 is designed to move the entire carriage 22, along with scanner 24 which is attached to the carriage, along the length of road surface scanning device 10 in the longitudinal direction A. As best shown in FIG. 3, the exemplary longitudinal actuator 28 includes a movable motor 80 that is securely attached to carriage 22 and moves up and down a stationary belt drive 82. Unlike the exemplary lateral actuator 26 where the motor is stationary and the belt drive moves, longitudinal actuator 28 uses a movable motor that advances along a stationary belt drive.

Movable motor 80 can be an electric stepper motor or any other suitable electric motor known to those skilled in the art. According to this particular embodiment, movable stepper motor 80 is mounted to a top side of carriage 22 so that it can move up and down the length of stationary belt drive 82 in the area in between longitudinal supports 38. Of course, the various motor embodiments mentioned above (i.e., different motor types, multiple motors, different motor locations, different drive mechanisms, etc.) apply to movable motor 80 as well.

Stationary belt drive 82 is securely fastened in between the lateral supports 40 of the frame and is pulled taut in order to provide movable motor 80 with a path along which it can move. The height at which the stationary belt drive 82 is attached to the frame is largely dependent on the location of the movable motor 80 and can vary depending on the needs of the application. Attachment points 84, 86 for stationary belt drive 82 can be located at a number of suitable places around frame 20, including the center mount locations shown in FIG. 3. Stationary belt drive 82 could be fastened to the frame with one or more spring tensioning devices that provide constant tension on the stationary belt drive to compensate for growth in the frame, belt, etc., and can also provide shock absorption during carriage movement.

Figure 4:
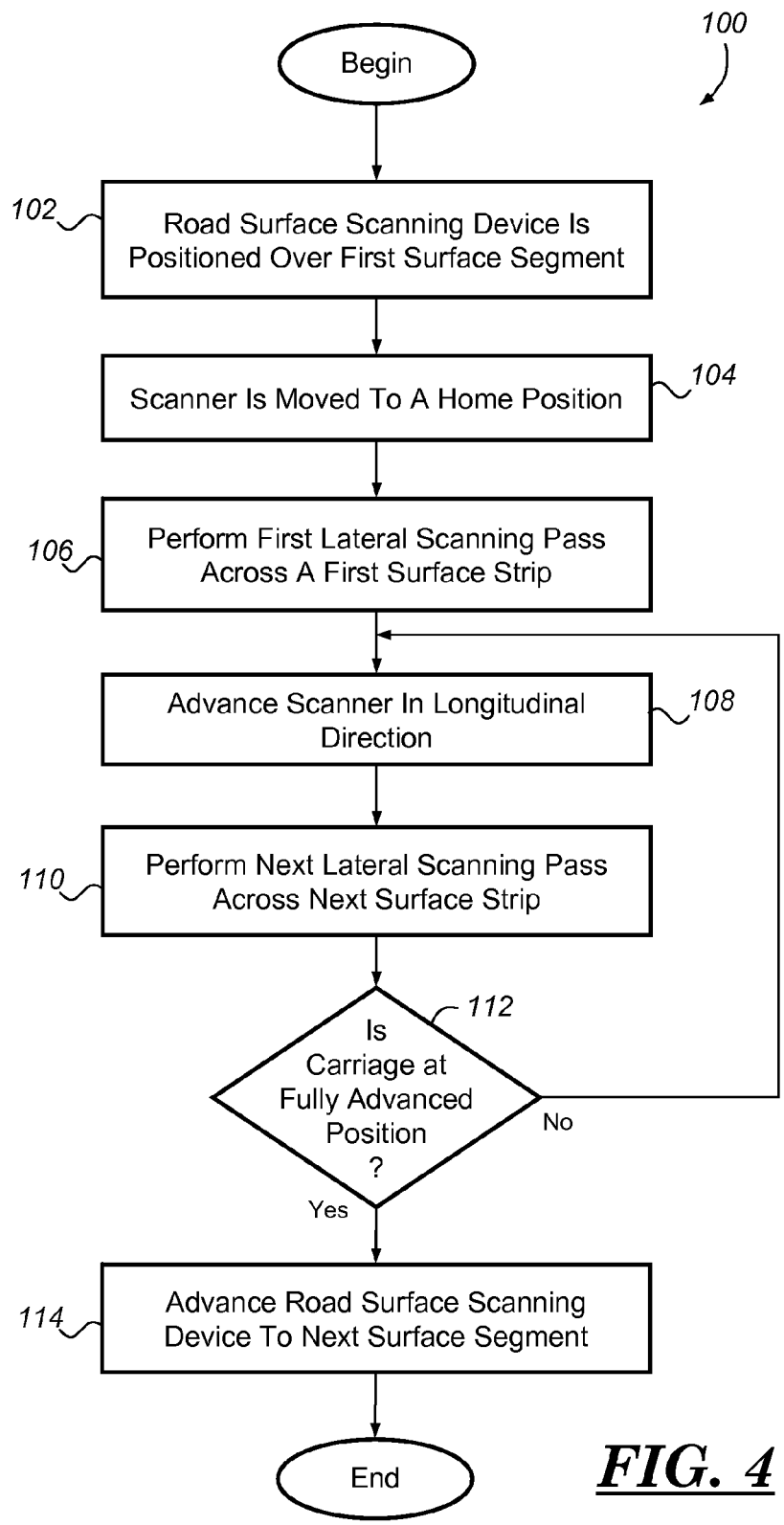
FIG. 4 is a flowchart illustrating some of the steps of an embodiment of a method for scanning a road surface.

In operation, road surface scanning device 10 acquires road surface data, which in turn can be used to create a mathematical model of the road. Turning now to FIG. 4, there is shown an embodiment of a scanning method 100 that examines a section of road by making consecutive passes back-and-forth across the road and advancing the scanner in between passes. Once the entire area located underneath road surface scanning device 10 has been scanned, tow vehicle 12 advances the entire scanning device so that a next area can be evaluated. In this way, method 100 is able to acquire the road surface data required to build a mathematical model of the scanned road; a mathematical model that could then be used for a variety of different purposes. It should be appreciated that FIG. 4 is used for purposes of illustration and is intended to provide a general flow of most of the steps involved in exemplary method 100.

Beginning with step 102, road surface scanning device 10 is positioned over top of a first surface segment. The term 'surface strip' refers to the strip-like area of road surface that is scanned during a single scanner pass, and the term 'surface segment' refers to the entire area of road surface located underneath road surface scanning device 10 or within its purview; i.e., the footprint of the road surface scanning device. Thus, a surface segment includes a number of surface strips. The first surface segment is typically the starting point for the section of road being evaluated. In this particular case, tow vehicle 12 pulls road surface scanning device 10 along vehicle test track 14 until the scanning device is over top of the surface segment in question. Once in position, stabilizers 46, wheel locks, or other precautions can be utilized to ensure that road surface scanning device 10 is stable and maintained in a stationary orientation during the scanning process.

Next, scanner 24 is moved to a home position, step 104. The home position can be a starting point from which the scanner begins scanning the first surface strip. In the exemplary embodiment described here, the home position for scanner 24 corresponds to a position at the back end of road surface scanning device 10 and at one of the two lateral ends; i.e., a back corner. In order to move scanner 24 to the home position, longitudinal actuator 28 drives carriage 22 in the longitudinal direction A so that it is at the very back end of the scanning device. Lateral actuator 26 drives the scanner along track 54 until it reaches one of its two ends. By starting the scanning process at the back of road surface scanning device 10 and working towards the front, the acquired road surface data can be better integrated with data from subsequent scans. It is, of course, possible to move the scanner to a home position that is different than the 'back-corner' position used here.

Once scanner 24 is in the home position, the scanning process begins with a first scanning pass, step 106. A scanning pass involves moving scanner 24 across a surface strip while at the same time recording the light that is emitted from laser head 60, reflected off of the road surface, and captured by camera 62. By way of example, laser head 60 emits a laser line that is generally aligned in the longitudinal direction A and has a length of about 0.25 m-0.5 m, inclusive, while lateral actuator 26 sweeps the scanner across a lateral surface strip that is about 2 m-3.5 m in width. This results in a scanned surface strip with an area that is about $0.5\ m^2$-$1.75\ m^2$, inclusive. Of course, the precise length of the laser line, width of the lateral surface strip, as well as other operational parameters could be altered to fit the particular needs of the application. Alternatively, the scanning pass could be performed in the longitudinal direction so that the surface strip is axially arranged. In this example, it would be helpful to rotate the scanner so that the incident laser line strikes the road surface in a lateral direction. A number of different scanning arrangements can be used so long as the incident laser line strikes the road surface in a generally perpendicular direction to the direction of scanner movement during the scanning operation. Returning to the exemplary embodiment, once scanner 24 is at the end of its first scanning pass, carriage 22 is advanced in a longitudinal direction, step 108.

In step 108, longitudinal actuator 28 advances carriage 22 in the longitudinal direction A so that scanner 24 is in position to perform the next lateral scanning pass. During this longitudinal advancement, scanner 24 is not measuring the road surface; rather, it is just for the purpose of moving the scanner forward so that a new surface strip can be analyzed. The distance that carriage 22 is advanced can depend on a variety of factors. In one embodiment, longitudinal actuator 28 indexes carriage 22 so that there is a partial overlap between adjacent surface strips; e.g., typically, a 15% overlap could be used to make sure that no un-scanned gaps are left between adjacent lateral surface strips. To illustrate, in an example where the laser line has a length of 0.35 m, step 108 would advance the scanner by about 0.2975 m instead of a full 0.35 m. This produces a surface strip overlap of about 15%.

In step 110, scanner 24 performs a second lateral scanning pass across a new surface strip. As before, a lateral scanning pass is performed by sweeping the scanner across the road surface in the lateral direction B, while gathering and acquiring road surface data with scanner 24. In order to make the scanning process more efficient, the second scanning pass can begin on the side of the scanning device where the previous scanning pass ended. At the end of the lateral scanning pass, step 112 checks to see if carriage 22, and hence scanner 24, is at a fully advanced position. If not, steps 108-110 are repeated. This back-and-forth scanning process is continued until carriage 22 has been advanced or moved all the way to the very front of road surface scanning device 10, at which point the scanner has gathered road surface data from the entire first surface segment. That is, all of the road surface located under the current position of road surface scanning device 10 has already been scanned.

Next, tow vehicle 12 pulls road surface scanning device 10 forward to the next surface segment, step 114, so that steps 102-112 can be repeated on the next adjacent surface segment. The road surface scanning device does not specifically need to be pulled behind tow vehicle 12, as it could be pushed, pulled, driven, or otherwise moved by any means known in the art. In one example, road surface scanning device 10 includes drive motors and a scanner so that the scanning device can follow a colored tape placed on the road, a painted edge of the road, etc. This obviates the need for tow vehicle 12 as the road surface scanning device would be automatically driven. As with the overlap between surface strips, step 114 can purposely advance the scanning device so that an overlap occurs between adjacent surface segments (e.g., an overlap of 5% to 90% could be used). This overlap could be evaluated during both positions of road scanning device 10. This ensures that no gaps or un-scanned sections of the road surface are left between surface segments. The previous sequence of steps occurs until the entire road surface in question has been scanned; at which point, one of a variety of different software techniques can be used to process the raw road surface data.

Because scanning method 100 sweeps a laser line across a road surface area, the method is able to gather road surface data that can be used to accurately build a three-dimensional model of the road. This is different than methods that sweep a laser point across a road surface distance, as these methods can only build a two-dimensional model of the road. In order to produce a three-dimensional model, these methods must extrapolate the road surface data to gain a third dimension, however, doing so can reduce the accuracy of the model.

As mentioned above, one of a variety of software techniques can be used to process the raw road surface data acquired during method 100. For example, the road surface data gathered by each of the individual scans can be visually inspected and registered or stitched together using known software applications, including that offered by Geomagic Studio. This produces a frame scan. Consecutive frame scans are then registered or stitched to one another to create a three-dimensional mathematical model of the road surface. This mathematical model, which may be in the form of a surface mesh, can then be edited, cleaned, processed, compressed, etc. In one embodiment, the mathematical model is cleaned by removing any intersecting or overlapping surfaces, such as those that occur between successive surface strips and surface segments. Small holes and other imperfections in the road surface of the mathematical model can be filled. Throughout this process, files may need to be converted into different file types so that they can subsequently be used by other software applications. Some common file types that could be used include rectangular grid, ADAMS road definition file (.rdf), or curved regular grid (.crg), to name a few.

Of course, various features and additional techniques could also be used. One such feature involves the use of position markers on the road surface being scanned so that the scanned road surface data can be correlated to the known locations of the position markers. The position markers are added to the road surface in question and can be determined using global positioning system (GPS) coordinates, general surveying techniques, etc. In one example, bright circular markers are placed on the road at known locations. When the road surface scanning device scans over these markers, they will show up in the resultant road surface data. Once this data is assembled into a mathematical model of the road, the scanned data can be aligned to the GPS coordinates of the position markers, thus orienting the road in space and correcting any accumulated errors over a large distance.

It is to be understood that the foregoing description is not a definition of the invention, but is a description of one or more preferred exemplary embodiments of the invention. The invention is not limited to the particular embodiment(s) disclosed herein, but rather is defined solely by the claims below. For example, different techniques could be used to electronically process the road surface data acquired in method 100. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A road surface scanning device, comprising:
a frame having a plurality of structural members including a longitudinal support that extends in a longitudinal direction of the scanning device, and a lateral support that extends in a lateral direction of the scanning device and is securely connected to the longitudinal support;
a carriage being movably attached to the frame so that it can move in the longitudinal direction of the scanning device;
a scanner for acquiring road surface data and having a laser head that emits an incident laser line towards the road surface, and a camera that receives a reflected laser line from the road surface;
a first actuator for moving the scanner along the carriage in the lateral direction of the scanning device; and
a second actuator for moving the carriage along the frame in the longitudinal direction of the scanning device, wherein the first actuator moves the scanner along the carriage during a lateral scan, and the second actuator moves the carriage along the frame in between lateral scans.

2. The road surface scanning device of claim 1, wherein the frame includes an additional longitudinal support, and each of the longitudinal supports has a channel for receiving a plurality of carriage wheels that roll within the channel when the second actuator moves the carriage in the longitudinal direction of the scanning device.

3. The road surface scanning device of claim 1, wherein the scanning device includes a plurality of frame wheels, the frame includes a towing hitch for attachment to a tow vehicle, and the scanner includes a power cable for connection with a tow vehicle electrical system so that the scanning device can be pulled behind the tow vehicle.

4. The road surface scanning device of claim 1, wherein the carriage hangs below the longitudinal support of the frame and includes a framework that extends in the lateral direction of the scanning device, a plurality of carriage wheels that are rotatably attached near the top of the carriage, and a track attached near the bottom of the carriage for movably receiving the scanner.

5. The road surface scanning device of claim 4, wherein the track includes at least one lateral extension that protrudes from an end of the carriage and increases the extent of the lateral scan.

6. The road surface scanning device of claim 4, wherein the track is pivotally attached near the bottom of the carriage so that the first actuator can move the scanner in different directions.

7. The road surface scanning device of claim 1, wherein the laser head emits the incident laser line in a direction that is generally aligned with the longitudinal direction of the scanning device, and the scanner moves along the carriage in a direction that is generally perpendicular to the incident laser line.

8. The road surface scanning device of claim 1, wherein the first actuator includes a stationary motor that is securely mounted to an outer end of the carriage and drives a belt drive that is coupled to the scanner.

9. The road surface scanning device of claim 1, wherein the second actuator includes a movable motor that is securely mounted to the carriage and moves along a stationary belt drive that is attached to the frame.

10. A method for scanning a road surface, comprising the steps of:
   (a) providing a road surface scanning device having at least a scanner, a first actuator, and a second actuator;
   (b) moving the scanner to a home position;
   (c) performing a first scanning pass across a first surface strip, wherein the first scanning pass involves moving the scanner with the first actuator while recording road surface data with the scanner;
   (d) advancing the scanner with the second actuator so that it is positioned over a second surface strip; and
   (e) performing a second scanning pass across the second surface strip, wherein the second scanning pass involves moving the scanner with the first actuator while recording road surface data with the scanner.

11. The method of claim 10, wherein the home position in step (b) is a back corner of the road surface scanning device.

12. The method of claim 10, wherein the first scanning pass in step (c) involves moving the scanner with the first actuator while recording road surface data in the form of laser light that is emitted from a laser head, reflected off of the road surface, and captured by a camera.

13. The method of claim 12, wherein the scanner is moved by the first actuator in a lateral direction, and the laser light is in the form of a laser line that is generally aligned in the longitudinal direction.

14. The method of claim 12, wherein the laser line has a length of 0.25 m-0.5 m, inclusive, and scans a first surface strip that has an area of 0.5 $m^2$-1.75 $m^2$, inclusive.

15. The method of claim 10, wherein the advancement of the scanner in step (d) involves moving a carriage that supports the scanner in a longitudinal direction with the second actuator, while disabling the scanner so that it does not record any road surface data.

16. The method of claim 15, wherein carriage is advanced so there is a partial overlap between the first and second surface strips.

17. The method of claim 10, wherein the second scanning pass performed in step (e) begins on the side of the road surface scanning device where the first scanning pass performed in step (c) ended.

18. The method of claim 10, wherein each of the first and second scanning passes in steps (c) and (e) involves emitting a laser line aligned in a first direction and sweeping the scanner across the surface strip in a second direction that is generally perpendicular to the first direction, and the road surface data that is acquired can be used to build a three-dimensional model of the road surface.

19. The method of claim 10, further comprising the step of scanning position markers located on the road surface, wherein the position markers have known positions and can be used when processing the road surface data.

* * * * *